United States Patent
Green et al.

(10) Patent No.: US 6,596,441 B1
(45) Date of Patent: Jul. 22, 2003

(54) ELECTROCHEMICAL CELL COMPRISING A LIQUID ORGANIC ELECTROLYTE WITH A CONDUCTIVE ADDITIVE

(75) Inventors: Kevin J Green, Gosport (GB); James C Wilson, London (GB); Susan J Howe, Gosport (GB); Philip N Barnes, Gosport (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/530,998

(22) PCT Filed: Dec. 8, 1998

(86) PCT No.: PCT/GB98/03615

§ 371 (c)(1),
(2), (4) Date: May 9, 2000

(87) PCT Pub. No.: WO99/30379

PCT Pub. Date: Jun. 17, 1999

(30) Foreign Application Priority Data

Dec. 10, 1997 (GB) ............................................... 9726008

(51) Int. Cl.[7] .......................... H01M 6/16; H01M 10/40
(52) U.S. Cl. ........................................ 429/326; 429/188
(58) Field of Search .................................. 429/188, 326

(56) References Cited

U.S. PATENT DOCUMENTS

| | | | |
|---|---|---|---|
| 3,997,362 A | | 12/1976 | Eustace et al. |
| 4,132,837 A | | 1/1979 | Soffer |
| 4,526,846 A | | 7/1985 | Kearney et al. |
| 4,537,843 A | | 8/1985 | Shishikura et al. |
| 5,085,955 A | * | 2/1992 | Cipriano .................. 429/197 |
| 5,514,493 A | | 5/1996 | Waddell et al. |
| 5,728,487 A | * | 3/1998 | Gratzel ...................... 429/111 |
| 5,916,475 A | * | 6/1999 | Michot ...................... 252/62.2 |
| 5,965,054 A | * | 10/1999 | McEwen .................. 252/62.2 |
| 6,120,696 A | * | 9/2000 | Armand ..................... 252/62.2 |
| 6,245,847 B1 | * | 6/2001 | Green ......................... 524/418 |

FOREIGN PATENT DOCUMENTS

| | | |
|---|---|---|
| EP | 0 547 794 A1 | 6/1993 |
| EP | 0 785 586 A1 | 7/1997 |
| FR | 2 704 099 | 10/1994 |
| GB | 2 107 918 A | 5/1983 |
| JP | 63-301467 | 12/1988 |
| JP | 03034270 * | 2/1991 .......... H01M/10/40 |

OTHER PUBLICATIONS

Hirai T et al.: "Effect of Additives on Lithium Cycling Efficiency" Journal of the Electrochmical society, vol. 141, No. 9, Sep. 1994, pp. 2300–2305.

* cited by examiner

Primary Examiner—Mark Ruthkosky
(74) Attorney, Agent, or Firm—Nixon & Vanderhye

(57) ABSTRACT

An electrochemical cell (1) comprises an anode (2), a solid cathode (3) and an electrolyte (4). The electrolyte comprises an electrochemically reactive conductive salt, an organic liquid phase comprising one or more organic compounds; and less than 0.25 M of all ionically charged additive, distinct from the electrochemically reactive conductive salt. The additive comprises a conductive salt which in use is not electrochemically reactive and which has a nitrogen containing cation in a sufficient quantity that conductivity is improved and percentage material utilisation of the cathode is improved at increased discharge rates as compared with a cell using an electrolyte which does not contain the additive. An improvement of approximately 10% in conductivity is achieved for a cell according to the invention using an electrolyte (c) with an additive.

12 Claims, 2 Drawing Sheets

ELECTROCHEMICAL CELL COMPRISING A LIQUID ORGANIC ELECTROLYTE WITH A CONDUCTIVE ADDITIVE

BACKGROUND OF THE INVENTION

This invention relates to a primary battery.

An electrolyte in an electrochemical cell may conduct electricity through the movement of ions, charged species, towards an electrode having opposite electrical charge to the ions. Typically, the electrolytes consist of a salt, such as potassium chloride, dissolved in a solvent, which may be water (aqueous) or one or more organic compounds (non-aqueous). Alternatively, molten salts or ionic liquids, or room temperature molten salts (materials and mixtures which consist of an ionically bound liquid at ambient temperatures) may be used.

The conductivity of such electrolytes is dependent on several factors and several mathematical relationships have been developed. The Nernst-Einstein Relationship relates the ion diffusion coefficient and the ion conductivity. The Stokes-Einstein Relationship relates the diffusion coefficient to the solution viscosity. Combining these relationships gives:

$$\lambda = \frac{kz^2 F^2}{6R\pi\eta a} \quad [1]$$

where $\lambda$ is the conductivity, k is the Boltzman constant, z is the ionic charge, F is the Faraday Constant, R is the gas constant and $\eta$ is the solution viscosity. The conductivity is also dependent on ion concentration:

$$\lambda = zc_i \mu F, \quad [2]$$

where $\lambda$ is the conductivity, z the charge $c_i$ the ion concentration, and F is Faraday's Constant. Thus it can be seen that decreasing the viscosity and increasing the ion concentration is beneficial to the overall ionic conductivity.

An example of a primary battery is a lithium primary battery, especially those using a metal oxide or sulphide cathode and lithium foil anode. These batteries use electrolytes composed of one or more metal salts dissolved in a non-aqueous solvent, usually composed of more than one organic compound. U.S. Pat. No. 4,537,843 describes an example of a secondary (rechargeable) battery having a polymeric electrode and an ammonium salt electrolyte. This type of electrolyte produces loose electrostatic bonding of positive and negative ions in solution at the surface of the electrodes when charged and the lithium salt is consumed by the cathode.

Hirai et al, Jn. of the Electrochemical Soc., vol. 141 (1994) pp.2300–2305, describe how the cycling efficiency of a secondary battery can be improved by the inclusion in the electrolyte of a tetraalkylammonium additive. The researchers report, however, that no influence of CTAC addition on rate capability was observed and further that ammonium chlorides with a shorter n-alkyl group than n-$C_{14}H_{29}$ decreased the discharge capacity of the cells.

FR2704099 describes how the addition of surface active fluorocarbon compounds to an electrolyte used in a secondary battery can improve the cycling efficiency. The results presented show that the effectiveness of the additive is dependent on the counter ion used, with lithium being more effective than quaternary ammonium.

BRIEF SUMMARY OF THE INVENTION

In accordance with the present invention, a primary battery comprises an anode, a solid cathode and an electrolyte; wherein the electrolyte comprises an electrochemically reactive conductive salt, an organic liquid phase comprising one or more organic compounds; and less than 0.25 M of an ionically charged additive, distinct from the electrochemically reactive conductive salt; the additive comprising a conductive salt, which in use is not electrochemically reactive and which contains an imidazolium cation, in a sufficient quantity that conductivity is improved and percentage material utilisation of the cathode is maintained or improved at increased discharge rates as compared with a battery using an electrolyte which does not contain the additive.

The battery of the present invention has increased conductivity and decreased loss in material utilisation at the electrode compared with other batteries such that the material utilisation observed at higher discharge rates is similar to that at low discharge rates. Primary batteries with the additive show improved discharge capacities and operating voltages compared to batteries without the additive. Using an additive in the electrolyte which is not electrochemically reactive makes the system simpler and allows the battery chemistry to be predicted more easily. The effect of the additive is to maintain a background level of conductivity, which assists in mass transport of the principal conductive ions through the electrolyte solution, as can be seen in equation [2].

One method of determining the utilisation of the electrode material is to determine the number of Coulombs per gram of active material (C/g) achieved. This figure can then be compared to a theoretical maximum number of Coulombs that could possibly be passed knowing the amount of active material in the cathode, hence giving a percentage utilisation and the number of Coulombs passed per gram of material.

Preferably, the reactive conductive salt comprises an alkali or alkaline earth metal salt or a quaternary ammonium salt.

Preferably, the reactive alkali or alkaline earth metal salt comprises one of lithium, sodium, potassium, magnesium and calcium.

Preferably, the quaternary ammonium salt comprises a 1 to 4 alkyl group substituted nitrogen containing cation.

Preferably, the anion of the reactive conductive salt comprises one chosen from chlorides; perchlorates; phosphates, such as hexafluorophosphate; borates such as tetrafluoroborate; and sulphonates, such as trifluoromethanesulphonate, although other metal salts could be used.

Preferably, the ionically charged additive comprises a dialkyl substituted salt More preferably, the alkyl substituents are independently selected from $C_1$ to $C_4$ alkyl groups. Alternatively, the salt is aryl substituted.

Preferably, the ionically charged additive comprises an anion chosen from chlorides, perchlorates, phosphates, borates and sulphonates.

Preferably, the additive comprises chloride, hexafluorophosphate, tetrafluoroborate, trifluoromethanesulphonate and nitrate.

The maximum amount of additive is 0.25 M, but preferably 0.05 M of the ionically charged additive is used.

Preferably, the organic solvent comprises one or more of cyclic carbonates and cyclic and linear ethers and polymers. For example, the organic liquid phase may be one or more of polyethyleneglycol, polyethylene oxide, propylene carbonate, ethylene carbonate, diethylcarbonate, dimethylcarbonate, ethylmethylcarbonate, tetrahydrofuran and dimethylglycolether, although other organic compounds may be used. For example polymer chains may be used to solvate the ionic species, sometimes organic solvents are used in addition to polymers. These have the effect of increasing the conductivity of polymeric systems.

Researchers have previously attempted to improve the performance of batteries using non-aqueous electrolytes by mixing in certain additives, either to improve the conductivity or stop deleterious side reactions. In the past researchers have added crown ethers, to improve lithium intercalation and carbon dioxide, to stabilise the lithium surface on recharge. Other compounds such as potassium hydroxide and potassium superoxide have been used to stabilise electrolytes and to improve the energy efficiency of the cell or battery. These function by reducing the chemical reactivity between the electrode material and the electrolyte.

The batteries of the present invention are able to maintain the energy density of the battery at increasing discharge rates. At high rates of discharge (high currents) using conventional electrolytes, polarisation of ionic species and internal resistance of the battery cause a loss of utilisation of available electrode material prior to the cut off voltage. The present invention decreases the loss in material utilisation at the electrode such that the material utilisation observed at higher discharge rates, is similar to that at low discharge rates.

DESCRIPTION OF THE DRAWINGS

Examples of primary batteries according to the present invention will now be described with reference to the accompanying drawing in which.

DETAILED DESCRIPTION OF THE INVENTION

Figure 1:
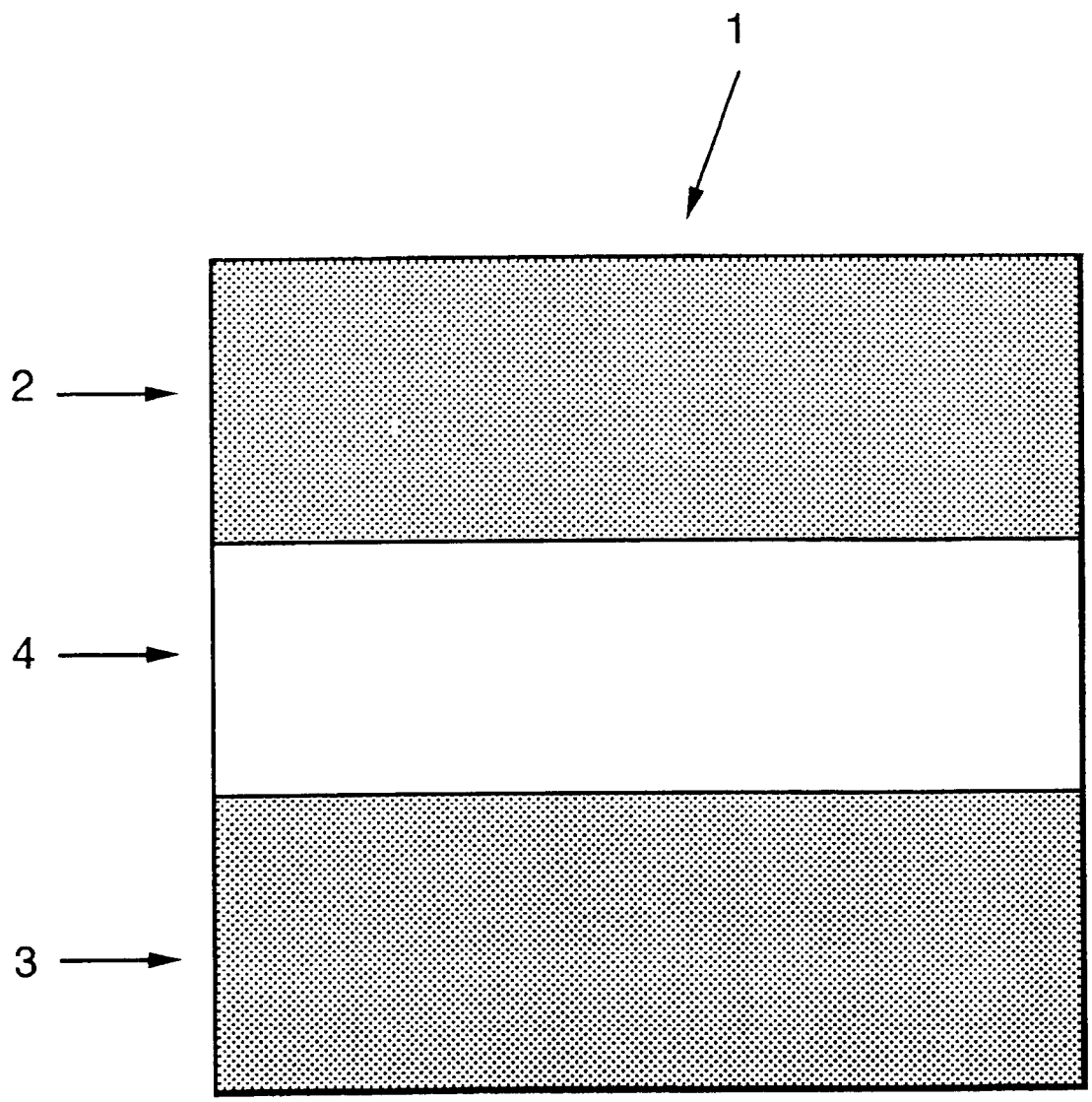
FIG. 1 shows an example of a primary battery according to the invention.

FIG. 1 shows a simple schematic of a primary battery. The battery 1 comprises an anode 2 and a cathode 3 separated by a void which is filled with an electrolyte 4. For a battery the anodes and cathodes are different.

Figure 2:
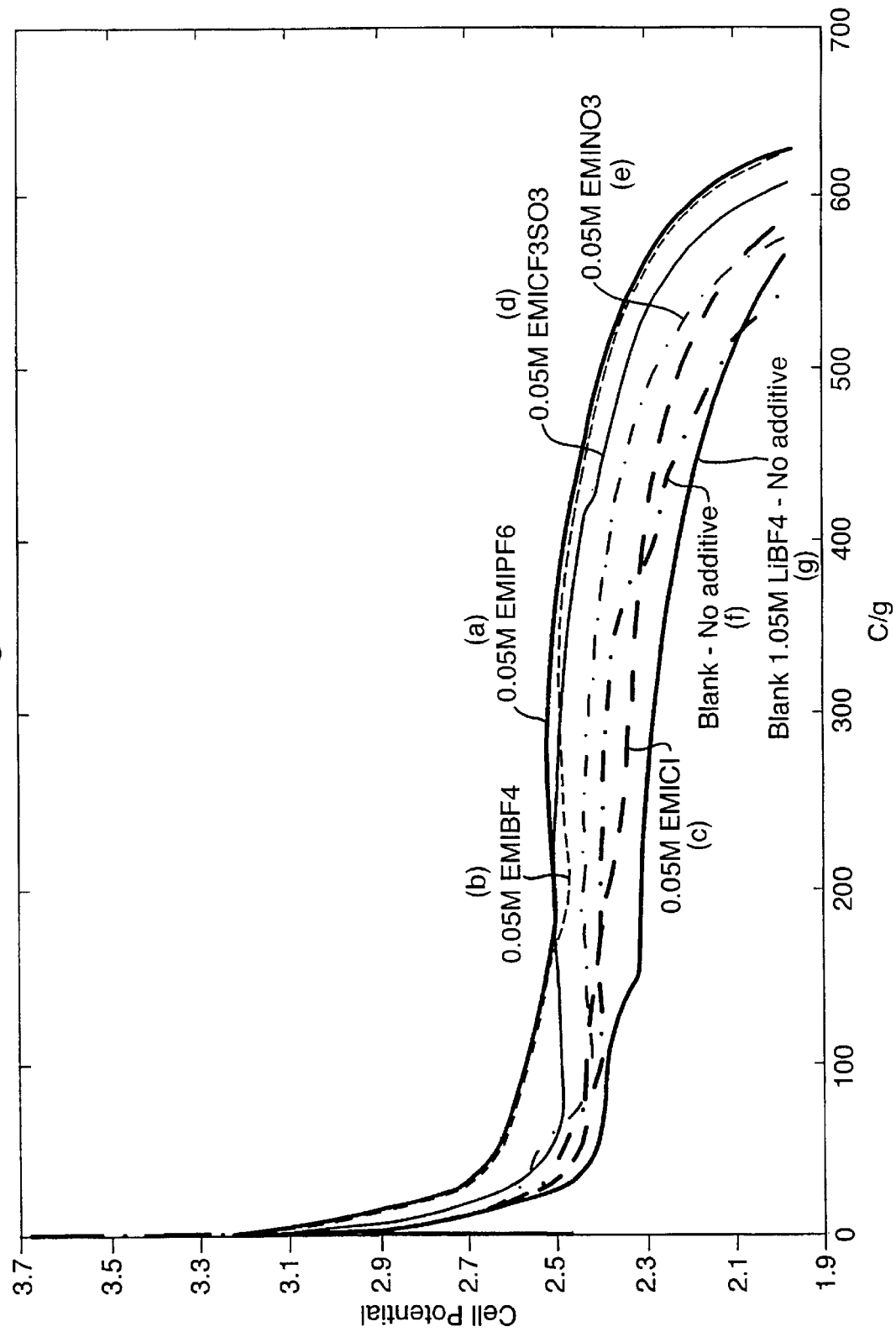
FIG. 2 shows curves of battery potential against Coulombs/gram for five different additives and one example without additives.

FIG. 2 shows a plot of material utilisation (Coulombs/gram) against battery voltage. During discharge battery voltage decreases as duration continues. The time axis (material utilisation) increases with time. At a predetermined voltage the discharge is said to be over and the battery is termed to be exhausted.

Table 1 shows the ionic conductivity of various electrolytes. The units for ionic conductivity are Siemens per cm. Also given where determined is the % utilisation of the active cathode material. It is evident from the data that the additive improves the ionic conductivity of the base, or blank, electrolyte. In addition it is also evident that the % utilisation is also improved.

Primary batteries using electrolytes based upon non-aqueous lithium ion conducting liquids were studied, although the lithium could be replaced by other alkali metal salts. The electrolytes were prepared in a conventional manner as follows. Dimethylethylene glycol (DME) (a.k.a dimethylglycolether) and ethylene carbonate (EC) were mixed together to form a single phase liquid. Sufficient lithium tetrafluoroborate ($LiBF_4$) was then dissolved in the liquid to give a one molar solution. Thereafter, sufficient material was added to give the required concentration to study the effect of the ionic additive. Other organic compounds which are suitable as solvents, include dialkyl solvents such as dimethylcarbonate and alkylene solvents such as propylene carbonate.

A number of tests were carried out using identical cathode and anodes and varying the electrolyte. In this example, the electrodes chosen were lithium as the anode material and manganese dioxide as the cathode material, though other combinations are possible. The formation of such electrode films is well known in the literature.

The manganese dioxide was incorporated into an electrode by dissolving a suitable binder, in this case ethylene propylene diene monomer (EPDM), in cyclohexane. Sufficient manganese dioxide and carbon black (to give the electrode electronic conductivity) were then added to the monomer solution to form a slurry. The slurry was then coated onto aluminium foil. The solvent was allowed to dry, leaving a film of active material on the aluminium foil.

Lithium foil and the manganese dioxide containing electrode were cut to size and placed together separated by a plastic membrane (not shown). Then sufficient electrolyte was added to soak the electrodes and separator. The battery 1 was sealed in an airtight vessel, and discharged on a suitable piece of laboratory apparatus. The current density (amps per square centimeter) and the utilisation (amount of active material in the cathode reacted) were taken as the primary metrics to determine the effectiveness of the electrolyte additive.

During testing, the time from start, cell voltage and discharge current (held constant) were all monitored. The material efficiency was determined using the following equation:

material utilisation=(discharge current*discharge time)/(mass of active material).

In this way small variations in cathode weights could be accounted for. For each time increment the cell voltage and material utilisation were then plotted. The resultant graphs showed that the additive generally gave a higher cell voltage on discharge and an increased material utilisation.

The results are illustrated in FIG. 2. Two blank solutions (no additive) were studied for comparative purposes. One was 1 M $LiBF_4$ (f) in DME:EC (1:1 by weight) and the other was 1.05 M $LiBF_4$ (g). The ionic materials studied were based upon the imidazolium cation, and several salts were studied in which the anion of the material varied. These were 3-ethyl-1-methyl imidazolium hexafluorophosphate (a); 3-ethyl-1-methyl imidazolium tetrafluoroborate (b); 3-ethyl-1-methyl imidazolium chloride (c); 3-ethyl-1-methyl imidazolium trifluoromethane sulphonate (d); and 3-ethyl-1-methyl imidazolium nitrate (e). Although other suitable materials exist, the examples illustrate the benefits of using these additives in producing higher than expected conductivity. The quantity of additive used was 0.05 M in each case, however, up to 0.25 M may be added to achieve the desired effect. The conductivity and percentage utilisation (at a high current rate of 10 $mA/cm^2$) is summarised in table 1 below.

TABLE 1

Effect of additive on electrolyte

| Additive/cation (0.05 M) | Conductivity/S $cm^{-1}$ | % Utilisation |
|---|---|---|
| [blank] | 0.0116 | 62 |
| imidazolium salts | | |
| chloride | 0.0120 | 67 |

TABLE 1-continued

Effect of additive on electrolyte

| Additive/cation (0.05 M) | Conductivity/S cm$^{-1}$ | % Utilisation |
|---|---|---|
| hexafluorophosphate | 0.0123 | 72 |
| tetrafluoroborate | 0.0124 | 71 |
| trifluromethanesulphonate | 0.0121 | 69 |
| nitrate | 0.0125 | 66 |
| tetraalkylammonium salts | | |
| hexafluorophosphate | 0.0119 | — |
| tetrafluoroborate | 0.0122 | — |

What is claimed is:

1. A primary battery comprising an anode, a solid cathode and an electrolyte; wherein the electrolyte comprises an electrochemically reactive conductive salt, an organic liquid phase comprising one or more organic compounds; and less than 0.25 M of an ionically charged additive, distinct from the electrochemically reactive conductive salt; the additive comprising a conductive salt, which in use is not electrochemically reactive and which contains an imidazolium cation, in a sufficient quantity that conductivity is improved and percentage material utilisation of the cathode is maintained or improved at increased discharge rates as compared with a cell using an electrolyte which does not contain the additive.

2. A primary battery according to claim 1, wherein the reactive conductive salt comprises an alkali or alkaline earth metal salt.

3. A primary battery according to claim 2, wherein the alkali or alkaline earth metal comprises one of lithium, sodium, potassium, magnesium and calcium.

4. A primary battery according to claim 1, wherein the reactive conductive salt comprises a quaternary ammonium salt.

5. A primary battery according to claim 4, wherein the ammonium salt comprises a 1 to 4 alkyl group substituted nitrogen containing cation.

6. A primary battery according to claim 1, wherein the anion of the reactive conductive salt is one of chloride, perchlorate, phosphate, borate and sulphonate.

7. A primary battery according to any claim 1, wherein the ionically charged additive comprises a dialkyl substituted salt.

8. A primary battery according to claim 7, wherein the alkyl substituents are independently selected from $C_1$ to $C_4$ alkyl groups.

9. A primary battery according to claim 1, wherein the ionically charged additive comprises an anion chosen from chlorides, perchlorates, phosphates, borates and sulphonates.

10. A primary battery according to claim 1, wherein 0.05 M of ionically charged additive is provided.

11. A primary battery according to claim 1, wherein the organic solvent comprises one or more of a cyclic carbonate, cyclic and linear ethers and polymers.

12. A primary battery according to claim 1, wherein the organic liquid phase comprises one or more of polyethyleneglycol, polyethylene oxide, propylene carbonate, ethylene carbonate, diethylcarbonate, dimethylcarbonate, ethylmethylcarbonate, tetrahydrofuran and dimethyiglycolether.

* * * * *